United States Patent
Albuerne et al.

(10) Patent No.: US 10,597,483 B2
(45) Date of Patent: Mar. 24, 2020

(54) COMPACT ELASTOMER MOLDED PARTS ON THE BASIS OF POLYURETHANE

(71) Applicant: BASF SE, Ludwigshafen (DE)

(72) Inventors: Julio Albuerne, Lemfoerde (DE); Rolf Illguth, Diepholz (DE); Franz Xaver Redl, Lemfoerde (DE); Bernd Bremert, Quakenbrueck (DE); Hermann Voelker, Olching (DE)

(73) Assignee: BASF SE, Ludwigshafen (DE)

( * ) Notice: Subject to any disclaimer, the term of this patent is extended or adjusted under 35 U.S.C. 154(b) by 501 days.

(21) Appl. No.: 15/314,812

(22) PCT Filed: May 22, 2015

(86) PCT No.: PCT/EP2015/061374
§ 371 (c)(1),
(2) Date: Nov. 29, 2016

(87) PCT Pub. No.: WO2015/185375
PCT Pub. Date: Dec. 10, 2015

(65) Prior Publication Data
US 2017/0198086 A1 Jul. 13, 2017

(30) Foreign Application Priority Data
Jun. 2, 2014 (EP) .................................. 14170798

(51) Int. Cl.
| | | |
|---|---|---|
| C08G 18/66 | (2006.01) | |
| C08G 18/79 | (2006.01) | |
| C08K 3/34 | (2006.01) | |
| C08K 7/14 | (2006.01) | |
| C08G 18/76 | (2006.01) | |
| C08G 18/42 | (2006.01) | |
| C08G 18/24 | (2006.01) | |
| C08G 18/32 | (2006.01) | |
| C08G 18/10 | (2006.01) | |
| B29C 45/00 | (2006.01) | |
| C08G 18/82 | (2006.01) | |
| C08K 5/098 | (2006.01) | |
| B29K 75/00 | (2006.01) | |
| B29K 309/08 | (2006.01) | |
| B29K 509/02 | (2006.01) | |

(Continued)

(52) U.S. Cl.
CPC ...... *C08G 18/6666* (2013.01); *B29C 45/0001* (2013.01); *C08G 18/10* (2013.01); *C08G 18/246* (2013.01); *C08G 18/3206* (2013.01); *C08G 18/4238* (2013.01); *C08G 18/664* (2013.01); *C08G 18/7671* (2013.01); *C08G 18/797* (2013.01); *C08G 18/82* (2013.01); *C08K 3/34* (2013.01); *C08K 5/098* (2013.01); *C08K 7/14* (2013.01); *B29K 2075/00* (2013.01); *B29K 2309/08* (2013.01); *B29K 2509/02* (2013.01); *B29K 2995/007* (2013.01); *B29L 2031/3005* (2013.01); *B29L 2031/768* (2013.01); *C08G 2120/00* (2013.01)

(58) Field of Classification Search
CPC .. C08G 18/6666; C08G 18/82; C08G 18/423; C08G 18/10; C08G 18/797; C08G 18/7671; C08G 18/3206; C08G 18/246; C08G 18/664; C08G 2120/00; B29C 45/0001; B29L 2031/768; B29L 2031/3005; B29K 2995/007; B29K 2509/02; B29K 2075/00; B29K 2309/08; C08K 5/098; C08K 3/34; C08K 7/14
See application file for complete search history.

(56) References Cited

U.S. PATENT DOCUMENTS

| | | | | |
|---|---|---|---|---|
| 4,581,387 A | * | 4/1986 | Werner | ............... B29C 33/60 |
| | | | | 252/182.18 |
| 4,764,537 A | * | 8/1988 | Horn | ................ C08J 9/0014 |
| | | | | 521/51 |

(Continued)

FOREIGN PATENT DOCUMENTS

| | | |
|---|---|---|
| CA | 1277471 C | 12/1990 |
| CA | 2107438 A1 | 4/1994 |

(Continued)

OTHER PUBLICATIONS

International Search Report for PCT/EP2015/061374, dated Aug. 24, 2015. 2 pages.

(Continued)

*Primary Examiner* — Seyed Masoud Malekzadeh
*Assistant Examiner* — Taryn Trace Willett
(74) *Attorney, Agent, or Firm* — Armstrong Teasdale LLP

(57) ABSTRACT

In a process for the production of pore-free polyurethane elastomer moldings with Shore D hardness of at least 60 in accordance with DIN 53505, (a) polyesterdiol with OH number from 20 to 100 mg KOH/g and (b) a chain extender composed of diol with molar mass below 300 g/mol, is mixed with (c) isocyanate prepolymers obtainable via reaction of diisocyanate with polyesterols with functionality from 1.95 to 2.2 and with OH number from 20 to 200 mg KOH/g to form a reaction mixture. The reaction mixture is charged to a mold and hardened to form the polyurethane elastomer. Polyurethane elastomer moldings are thus obtainable by this process, and these polyurethane moldings may be used as cladding component for commercial vehicles, bodywork component in vehicle construction, or a cladding component of a machine installation.

14 Claims, No Drawings

(51) Int. Cl.
B29L 31/30 (2006.01)
B29L 31/00 (2006.01)

(56) References Cited

U.S. PATENT DOCUMENTS

| | | | | |
|---|---|---|---|---|
| 4,935,460 | A * | 6/1990 | Cassidy | C08G 18/10 252/182.18 |
| 2010/0113733 | A1 * | 5/2010 | Cox | B29C 45/0001 528/65 |
| 2011/0306734 | A1 * | 12/2011 | Brauer | C08G 18/10 525/440.08 |
| 2013/0040810 | A1 * | 2/2013 | Haeberle | B26B 21/4012 502/402 |
| 2014/0043586 | A1 * | 2/2014 | Hiraren | C09K 9/02 351/159.61 |
| 2016/0145372 | A1 * | 5/2016 | Doroodian | C08G 18/4879 521/159 |
| 2017/0114177 | A1 * | 4/2017 | Li | C08G 18/10 |

FOREIGN PATENT DOCUMENTS

| | | |
|---|---|---|
| DE | 3607447 A1 | 9/1987 |
| DE | 4232941 | 4/1994 |
| EP | 0153639 A2 | 9/1985 |
| EP | 1964866 | 9/2011 |

OTHER PUBLICATIONS

Kunststoffhandbuch, Band 7, Polyurethane, Carl-Hanser-Verlag, 3. Auflage 1993, Kapitel 3.4.1.
Kunststoffhandbuch, Band 7, Polyurethane, Carl-Hanser-Verlag, 3. Auflage 1993, Kapitel 3.4.4.
Kunststoffhandbuch, Band 7, Polyurethane, Carl-Hanser-Verlag, 3. Auflage 1993, Kapitel 3.4.6 bis 3.4.11.
Kunststoffhandbuch, Band 7, Polyurethane, Carl-Hanser-Verlag, 3. Auflage 1993, Kapitel 4.
Kunststoffhandbuch, Band 7, Polyurethane, Carl-Hanser-Verlag, 3. Auflage 1993, Kapitel 8.2.

* cited by examiner

COMPACT ELASTOMER MOLDED PARTS ON THE BASIS OF POLYURETHANE

CROSS-REFERENCE TO RELATED APPLICATIONS

This application is a U.S. National Phase Application of PCT/EP2015/061374, filed May 22, 2015, which is incorporated herein by reference in its entirety.

DESCRIPTION

The present invention relates to a process for the production of pore-free polyurethane elastomer moldings with Shore D hardness 60 or more in accordance with DIN 53505, by mixing (a) polyesterdiol with OH number from 20 to 100 mg KOH/g and (b) chain extender composed of diol with molar mass below 300 g/mol, with (c) isocyanate prepolymers obtainable via reaction of diisocyanate with polyesterols with functionality from 1.95 to 2.2 and with OH number from 20 to 200 mg KOH/g and optionally (d) catalysts, (e) emulsifier and (f) other additives to give a reaction mixture, charging to a mold, and hardening to give the polyurethane elastomer, where the ratio by weight of polyesterdiol (a) to chain extender (b) is in the range from 70:30 to 40:60. The present invention further relates to polyurethane elastomer moldings obtainable by this process, and also to the use of these polyurethane moldings as cladding component for commercial vehicles, bodywork component in vehicle construction, or a cladding component of a machine installation.

Moldings for the production of elastomeric polyurethane (cast elastomers based on diols) are usually cast by the low-pressure process. (Problem: typical RIM systems are also often termed elastomers) For this, isocyanate, isocyanate-reactive component and optionally chain extender, and also catalysts and other additives are metered into a mixing head by a gear pump that provides precise metering, are mixed there with the aid of a mechanical stirrer, and charged to an open mold. This process known as low-pressure process is described by way of example in "Kunststoffhandbuch, Band 7, Polyurethane" [Plastic Handbook, volume 7, Polyurethanes], Carl Hanser Verlag, 3$^{rd}$ edition 1993, chapter 4. The low-pressure process has the disadvantage that cost-effective production of the moldings can be achieved only in open molds and, respectively, in closed molds with simple geometry and low fill volume, because the conveying pressure and conveying rate provided by the low-pressure systems is insufficient to fill complex, large-volume closed molds. If the intention is to produce relatively large moldings, it is necessary to select the catalyst in such a way that the reaction mixture retains low viscosity for a long period; this results in a long hardening time and is therefore uneconomic.

DE 4232941 discloses the production of elastomeric polyurethane moldings by the countercurrent method, known as the high-pressure process. This process permits rapid and complete filling, even of complex, large-volume molds, because high pressure can be used to fill the mold, and the high-pressure process can provide a high conveying rate. A disadvantage of the process according to DE 4232941 is that moldings with hardness 60 Shore D in accordance with DIN 53505 and there above have poor mechanical properties, for example stiffness, tensile strength, and tensile strain at break, and also have surface defects.

EP 1964866 describes the production of hard, pore-free polyurethane elastomer moldings with Shore D hardness 60 or more, by reacting polytetrahydrofuran and butanediol with isocyanate and emulsifier and release agent, and also optionally catalysts, reactive chain extenders, and also additives to give the polyurethane elastomer. It is disadvantageous here that the polyol component demixes at room temperature, and that therefore emulsifier is required, and that the isocyanate component is unstable at room temperature and is susceptible to phase-separation. The polytetrahydrofurans used are also expensive. The surface quality of the polyurethane moldings according to EP 1964866 moreover requires improvement.

It was therefore an object of the present invention to provide compact elastomer moldings which are based on polyurethane and which have excellent surface properties, and which can be processed without use of and release agents.

The object of the invention is achieved via polyurethane elastomer moldings with Shore D hardness 60 or more in accordance with DIN 53505, producible by a process of mixing (a) polyesterdiol with OH number from 20 to 100 mg KOH/g and (b) chain extender composed of diol with molar mass below 300 g/mol, with (c) isocyanate prepolymers obtainable via reaction of diisocyanate with polyesterols with functionality from 1.95 to 2.2 and with OH number from 20 to 200 mg KOH/g and optionally (d) catalysts, (e) emulsifier and (f) other additives to give a reaction mixture, charging to a mold, and hardening to give the polyurethane elastomer, where the ratio by weight of polyesterdiol (a) to chain extender (b) is in the range from 70:30 to 40:60.

Polyesterdiols (a) used are polyesters having two OH groups reactive to all isocyanates, the OH number of said polyesters being from 20 to 100 mg KOH/g, preferably from 35 to 80 mg KOH/g, and particularly preferably from 45 to 60 mg KOH/g. Polyesterdiols can by way of example be produced from organic dicarboxylic acids having from 2 to 12 carbon atoms, preferably aliphatic dicarboxylic acids having from 4 to 6 carbon atoms, and from dihydric alcohols having from 2 to 12 carbon atoms, preferably from 2 to 6 carbon atoms. Examples of dicarboxylic acids that can be used are: succinic acid, glutaric acid, adipic acid, suberic acid, azelaic acid, sebacic acid, decanedicarboxylic acid, maleic acid, fumaric acid, phthalic acid, isophthalic acid, and terephthalic acid. The dicarboxylic acids here can be used either individually or else in a mixture with one another. It is also possible to use the corresponding dicarboxylic acid derivatives instead of the free dicarboxylic acids, examples being dicarboxylic esters of alcohols having from 1 to 4 carbon atoms, and dicarboxylic anhydrides. It is preferable to use, as dicarboxylic acid component, dicarboxylic acid mixtures comprising adipic acid, for example mixtures of succinic, glutaric, and adipic acid in quantitative ratios of, for example, from 20 to 35:from 35 to 50:from 20 to 32 parts by weight, and in particular to use exclusively adipic acid as dicarboxylic acid component.

Examples of diols are: ethanediol, diethylene glycol, 1,2- and 1,3-propanediol, dipropylene glycol, 1,4-butanediol, 1,5-pentanediol, 1,6-hexanediol, and 1,10-decanediol. It is preferable to use ethanediol, diethylene glycol, 1,4-butanediol, 1,5-pentanediol, and 1,6-hexanediol. It is moreover possible to use polyester polyols made of lactones, e.g. ε-caprolactone, or hydroxycarboxylic acids, e.g. ω-hydroxycaproic acid. It is preferable that the diol component for the production of polyesterdiols comprises (a) diols having from 4 to 8 carbon atoms, particularly preferably 1,4-butanediol in a mixture or as sole diol component. In a preferred embodiment the diol component is composed of diols having an average of from 4 to 8 carbon atoms, based on the molecular number of the diols comprised in the diol component. This is determined by calculating the total number of the molecules with respectively equal content of carbon atoms and multiplying by the respective number of carbon atoms comprised, and then dividing this total by the total number of diol molecules for the production of the polyesterdiol (a).

For the production of the polyester polyols (a), the dicarboxylic acids and/or derivatives thereof and dihydric alcohols can be polycondensed without catalyst or preferably in the presence of a esterification catalyst, advantageously in an atmosphere of inert gas, e.g. nitrogen, carbon monoxide, helium, argon, etc. in the melt at temperatures from 150 to 250° C., preferably from 180 to 220° C., optionally under reduced pressure, until the desired acid number has been reached, this preferably being smaller than 10, particularly preferably smaller than 2. In a preferred embodiment as esterification mixture is polycondensed under atmospheric pressure in the abovementioned temperatures until an acid number from 80 to 30, preferably from 40 to 30, has been reached, and then polycondensed under a pressure below 500 mbar, preferably from 50 to 150 mbar. Examples of esterification catalysts that can be used are iron catalysts, cadmium catalysts, cobalt catalysts, lead catalysts, zinc catalysts, antimony catalysts, magnesium catalysts, titanium catalysts, and tin catalysts in the form of metals, metal oxides, or metal salts. However, it is also possible to carry out the polycondensation in liquid phase in the presence of diluents and/or entrainers, e.g. benzene, toluene, xylene, or chlorobenzene in order to remove the water of condensation by azeotropic distillation. The molar ratio in which the organic polycarboxylic acids and/or derivatives thereof and polyhydric alcohols are polycondensed for the production of the polyester polyols is advantageously 1:from 1 to 1.8, preferably 1:from 1.05 to 1.2.

Polyesterdiols (a) preferably used are polyesters of adipic acid, butanediol, and neopentyl glycol, of adipic acid and a mixture of butanediol, pentanediol, and hexanediol, of adipic acid and butanediol, of adipic acid and hexanediol, of adipic acid and a mixture of butanediol and ethylene glycol, of adipic acid and a mixture of hexanediol and ethylene glycol, of dodecanediacid and neopentyl glycol, or of sebacic acid and neopentyl glycol.

A preferred embodiment uses only the ethers optionally described in components (a) to (f), and none of the other polyetherols known in polyurethane chemistry.

In particular, use of polyetherols with functionality greater than 2, preferably from 2 to 8, and with number-average molar mass greater than 450 g/mol, preferably from 500 to 6000 g/mol, is avoided.

A chain extender (b) is moreover added to the reaction mixture. This is a diol with molar mass below 400 g/mol, preferably below 300 g/mol, and in particular below 200 g/mol. Examples of chain extenders that can be used are hydroquinone bis(2-hydroxyethyl) ether, resorcinol, 1,6 hexanediol, monoethylene glycol, diethylene glycol, and butanediol, for example 1,4-butanediol, 2,3-butanediol, and mixtures of the two. It is preferable to use butanediol as chain extender, and it is particularly preferable to use 1,4-butanediol as chain extender.

The ratio by weight of chain extender to polyesterdiols is from 30:70 to 60:40, preferably from 40:60 to 50:50.

Isocyanate prepolymer used is the reaction product of diisocyanate with polyesterols with functionality from 1.95 to 2.2 and with OH number from 20 to 200 mg KOH/g. The isocyanate content of the prepolymer is preferably from 15 to 32% by weight of NCO, preferably from 20 to 30% by weight of NCO, and in particular from 24 to 29% by weight of NCO.

Isocyanates used are preferably diisocyanates, particularly preferably aromatic diisocyanates, or else aliphatic diisocyanates, for example hexamethylene diisocyanate (HDI), 4,4'-diisocyanato-dicyclohexylmethane (HMDI), or isophorone diisocyanate (IPDI). The aromatic isocyanates comprise by way of example aromatic diisocyanates, for example diphenylmethane 2,2'-, 2,4'-, and 4,4'-diisocyanate and derivatives of these, mixtures of various monomeric diphenylmethane diisocyanates, tolylene 2,4- or 2,6-diisocyanate (TDI) and mixtures of these, and naphthylene diisocyanate (NDI), and mixtures thereof. Isocyanates used are preferably monomeric diphenylmethane 4,4'-diisocyanate or a mixture of diphenylmethane 4,4'-diisocyanate with its derivatives. Diphenylmethane 4,4'-diisocyanate here can particularly preferably comprise small quantities, up to about 10% by weight, of carbodiimide-, uretdione-, allophanate-, or uretoneimine-modified diphenylmethane 4,4'-diisocyanate, in particular carbodiimide-modified diphenylmethane 4,4'-diisocyanate. The functionality of the isocyanate used can be increased via addition of isocyanates of higher functionality. The functionality of the isocyanate is preferably 2.0 to 2.2, in particular 2.0. Functionality can be increased by way of example by using carbodiimide-modified diphenylmethane 4,4'-diisocyanate. In a particularly preferred embodiment diphenylmethane 4,4'-diisocyanate is used as diisocyanate and preferably comprises from 0 to 10% by weight based on the total weight of the isocyanate used, of carbodiimide-modified diphenylmethane 4,4'-diisocyanate.

The isocyanate prepolymers are obtainable by reacting polyisocyanates described above in excess with polyester polyols described above, and optionally the chain extenders described above, for example at temperatures of from 30 to 100° C., preferably at about 80° C., to give the prepolymer.

Polyester polyol used for the production of the polyisocyanate prepolymers (c) is polyesterol with functionality from 1.95 to 2.2 and with OH number from 20 to 200 mg KOH/g. These polyester polyols are obtained as described under (a). Functionality can be increased above two by using higher-functionality polyols, for example glycerol and trimethylolpropane, to replace a portion of the diols used in the diol component. It is preferable that no polyetherols are used for the production of the isocyanate prepolymers (c).

The functionality of the components used for the production of the isocyanate prepolymer (c) is preferably selected in such a way that the average functionality of the isocyanate prepolymer (c) is from 1.95 to 2.2, particularly from 2.0 to 2.1, and in particular from 2.00 to 2.05.

Catalysts (d) used can be any of the catalysts conventionally used for the production of polyurethane. These catalysts are described by way of example in "Kunststoffhandbuch, Band 7, Polyurethane [Plastics Handbook, volume 7, Polyurethanes]", Carl Hanser Verlag, 3$^{rd}$ edition 1993, chapter 3.4.1. Examples of catalysts used here are organometallic compounds, preferably organotin compounds, for example tin(II) salts of organic carboxylic acids, e.g. tin(II) acetate, tin(II) octanoate, tin(II) ethylhexanoate, and tin(II) laurate, and the dialkyltin(IV) salts of organic carboxylic acid, e.g. dibutyltin diacetate, dibutyltin dilaurate, dibutyltin maleate, and dioctyltin diacetate, or dialkyltin(IV) mercaptides, or else bismuth carboxylates, for example bismuth(III) neodecanoate, bismuth 2-ethylhexanoate, and bismuth octanoate, or else phenylmercury(II) salts of organic carboxylic acids, e.g. phenylmercury laurate or phenylmercury propionate, or a mixture. Other possible catalysts are strongly basic amine catalysts. Examples of these are amidines, for example 2,3-dimethyl-3,4,5,6-tetrahydropyrimidine, tertiary amines, for example triethylamine, tributylamine, dimethylbenzylamine, N-methyl-, N-ethyl-, N-cyclohexylmorpholine, N,N,N'N-tetramethylethylenediamine, N,N,N'N-tetramethylbutanediamine, N,N,N',N'-tetramethylhexanediamine, pentamethyldiethylentriamine, tetramethyldiaminoethyl ether, bis(dimethylaminopropyl)urea, dimethylpiperazine, 1,2-dimethylimidazole, 1-aza-bicyclo[3.3.0]-octane, and 1,4-diazabicyclo[2.2.2]octane, and also alkanolamine compounds, for example triethanolamine, triisopropanolamine, N-methyl- and N-ethyldiethanolamine, and dimethylethanolamine. The strongly basic amine catalysts here can then also have been blocked entirely or to some extent via addition of acids. The catalysts can be used individually or as mixtures. Catalysts (e) optionally used are mixtures of metal catalysts and basic amine catalysts, which optionally can have been blocked entirely or to some extent.

The catalysts can by way of example be used at a concentration of from 0.001 to 5% by weight, in particular from 0.002 to 1% by weight, in the form of catalyst or catalyst combination, based on the weight of polymeric diol, chain extender, reactive chain extender, and catalyst.

Emulsifiers (e) used can be any known surfactant, for example anionic surfactants, cationic surfactants, or nonionic surfactants. It is preferable to use nonionic surfactants, for example fatty alcohol ethoxylates, oxo alcohol ethoxylates, Guerbet alcohol ethoxylates, alkylphenol ethoxylates, ethoxylated oleylamine, ethoxylated coconut fatty amine, ethoxylated tallow fatty amine, ethoxylated oleamide, EO/PO block polymers, PIB derivatives, and amides of oleic acid. In particular, an alkoxyethylene glycol ether of the general formula

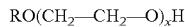

RO(CH$_2$—CH$_2$—O)$_x$H is used as emulsifier, where R is a linear or branched-chain or cyclic alkyl moiety having from 5 to 20 carbon atoms, and x is an integer from 3 to 15. It is particularly preferable that R is a decyl moiety and that x is 7.

In a preferred embodiment of the present invention no emulsifier (e) is used.

Additives (f) used can be any of the auxiliaries and additives known for the production of polyurethanes. Examples that may be mentioned are release agents, fillers, dyes, pigments, flame retardants, surfactant substances, and hydrolysis stabilizers. These substances are mentioned by way of example in "Kunststoffhandbuch, Band 7, Polyurethane [Plastics Handbook, volume 7, Polyurethanes]", Carl Hanser Verlag, 3$^{rd}$ edition 1993, chapters 3.4.4 and 3.4.6 to 3.4.11.

Examples of suitable release agents that may be mentioned are: polysilicones, reaction products of fatty acid esters with polyisocyanates, salts of fatty acids and of polysiloxanes comprising amino groups, salts of saturated or unsaturated (cyclo)aliphatic carboxylic acids having at least 8 C atoms and of tertiary amines, and also in particular internal release agents, for example carboxylic esters and/or carboxamides produced via esterification or amidation of a mixture of montane acid and of at least one aliphatic carboxylic acid having at least 10 C atoms with at least difunctional alkanolamines, polyols, and/or polyamines with molar masses from 60 to 400 g/mol, as disclosed by way of example in EP 153 639, mixtures of organic amines, metal stearates, and organic mono- and/or dicarboxylic acids, or anhydrides thereof, as disclosed by way of example in DE-A-3 607 447, or mixtures of an imino compound, the metal salt of a carboxylic acid, and optionally a carboxylic acid, as disclosed by way of example in U.S. Pat. No. 4,764,537. Release agent used is preferably a metal salt of stearic acid, particularly preferably zinc stearate, in particular together with the reactive chain extender. The zinc stearate here is dissolved in the liquid reactive chain extender, preferably the polypropylene oxide having two terminal amino groups. For the purposes of the present invention it is preferable to use no release agents.

Fillers, in particular reinforcing fillers, are the conventional organic and inorganic fillers, reinforcing agents, etc. known per se. Specific examples that may be mentioned are: inorganic fillers such as silicatic minerals, for example powdered quartz, phyllosilicates, for example antigorite, serpentine, hornblends, amphiboles, chrysotil, and talc powder; metal oxides, for example kaolin, aluminum oxides, titanium oxides, and iron oxides, metal salts such as chalk, baryte, and inorganic pigments, for example cadmium sulfide, zinc sulfide, and also glass and others. It is preferable to use kaolin (China clay), powdered quartz, aluminum silicate, and coprecipitates of barium sulfate and aluminum silicate, or else natural and synthetic fibrous minerals such as wollastonite, and fibers of various length made of metal or of glass, which can optionally have been sized. Examples of organic fillers that can be used: carbon, melamine, rosin, cyclopentadienyl resins, and graft polymers, and also cellulose fibers, polyamide fibers, polyacrylonitrile fibers, polyurethane fibers, and polyester fibers based on aromatic and/or aliphatic dicarboxylic esters, and in particular carbon fibers.

Fillers used are preferably those with average particle diameter from 0.1 to 500 μm, particularly from 1 to 100 μm, and in particular from 1 to 10 μm. In the case of non-spherical particles, diameter here is the dimension of these along the shortest spatial axis. Fillers preferably used are glass fibers and powdered quartz. Other fillers that can moreover be used are textile mats, for example glass fiber mats, or natural fiber mats.

The inorganic and organic fillers can be used individually or in the form of mixtures, and quantities of these advantageously used in the reaction mixture are from 0.5 to 30% by weight, particularly preferably from 10 to 20% by weight, based on the weight of the entire reaction mixture.

Additives used for water adsorption are preferably aluminosilicates selected from the group of the sodium aluminosilicates, potassium aluminosilicates, calcium aluminosilicates, cesium aluminosilicates, barium aluminosilicates, magnesium aluminosilicates, strontium aluminosilicates, sodium aluminophosphates, potassium aluminophosphates, calcium aluminophosphates, and mixtures thereof. It is particularly preferable to use mixtures of sodium aluminosilicates, potassium aluminosilicates, and calcium aluminosilicates in castor oil as carrier.

The average particle size of the additive for water absorption is preferably not greater than 200 μm, particularly preferably not greater than 150 μm, in particular not greater than 100 μm. It is preferable that the pore width of the additive of the invention for water absorption is from 2 to 5 Å.

When an additive is added for water absorption, quantities thereof preferably added are greater than one part by weight, particularly preferably in the range from 1.2 to 4 parts by weight, based on the total weight of components (a) to (f).

Flame retardants used can generally be the flame retardants known from the prior art. Examples of suitable flame retardants are brominated ethers (Ixol B 251), brominated alcohols, for example dibromoneopentyl alcohol, tribromoneopentyl alcohol, and PHT-4-diol, and also chlorinated phosphates, for example tris(2-chloroethyl) phosphate, tris(2-chloroisopropyl) phosphate (TCPP), tris(1,3-dichloroisopropyl) phosphate, tris(2,3-dibromopropyl) phosphate, and tetrakis(2-chloroethyl) ethylene diphosphate, or a mixture thereof.

Compounds that can also be used to provide flame retardants to the rigid polyurethane foams produced in the invention, alongside the abovementioned halogen-substituted phosphates, are inorganic flame retardants, for example red phosphorus, preparations comprising phosphorus, expandable graphite, aluminum oxide hydrate, antimony trioxide, arsenic oxide, ammonium polyphosphate, and calcium sulfate, or cyanuric acid derivatives, for example melamine, or a mixture of at least two flame retardants, for example ammonium polyphosphates and melamine, or else optionally starch.

Other liquid halogen-free flame retardants that can be used are diethyl ethanephosphonate (DEEP), triethyl phosphate (TEP), dimethyl propylphosphonate (DMPP), diphenyl cresyl phosphate (DPC), and others.

For the purposes of the present invention, the quantity used of the flame retardants is preferably from 0 to 60% by weight, particularly preferably from 5 to 50% by weight, in particular from 5 to 40% by weight, based on the total weight of components (a) to (f).

For the production of the polyurethane moldings of the invention, (a) polyesterdiol and (b) chain extender are mixed with (c) isocyanate prepolymer and optionally (d) catalysts, (e) emulsifier, and (f) other additives to give a reaction mixture, charged to a mold, and hardened to give the polyurethane elastomer. For this, it is preferable that quantities of (a) polyesterdiol and of (b) chain extender and optionally present (d) catalysts, (e) emulsifiers, and (f) additives reacted with the isocyanate prepolymer (c) are such that the isocyanate index is from 95 to 110, particularly preferably from 100 to 106, and in particular from 101 to 105. For the purposes of the present invention, the isocyanate index is the stoichiometric ratio of isocyanate groups to groups reactive toward isocyanate, multiplied by 100. Groups reactive toward isocyanate here are all of the groups reactive toward isocyanate comprised in the reaction mixture, inclusive of chemical blowing agents, but not the isocyanate group itself.

It is preferable here to use the two-component process, where a polyol component is mixed with an isocyanate component. The polyol component in the two-component process preferably comprises, alongside (a) polyesterdiol and (b) chain extender, (d) catalysts, (e) emulsifiers, and (f) additives. The isocyanate component comprises the isocyanate prepolymer (c).

The mixing of the starting materials, preferably of the polyol component and of the isocyanate component, preferably takes place here by the high-pressure process. The polyol component and isocyanate are then injected with high pressure of in each case at least 100 bar, preferably from 100 to 300 bar, into a mixing chamber, where they are combined. The pressure drop to the outlet of the mixing chamber is at least 50 bar, preferably from 50 to 250 bar. With this process it is possible to fill large complex molds with flow paths of up to 3 meters within a few seconds. The temperature of the polyol component and isocyanate is preferably controlled to from 30 to 120° C., preferably from 50 to 100° C. The mold temperature is preferably from 70 to 130° C., particularly preferably from 100 to 120° C.

Another advantage of the process of the invention is that it is possible to produce large, complex moldings from thermoplastic polyurethane. The expression thermoplastic polyurethane means a polyurethane which exhibits thermoplastic properties. The meaning of the expression thermoplastic properties here is that the thermoplastic polyurethane can be repeatedly melted on heating, and thereby exhibits plastic flow. Further details relating to thermoplastic polyurethanes of the invention are found in "Kunststoffhandbuch, Band 7, Polyurethane [Plastics Handbook, volume 7, Polyurethanes]", Carl Hanser Verlag, $3^{rd}$ edition 1993, chapter 8.2. For the purposes of the invention, thermoplastic polyurethane is obtained when isocyanate used is exclusively diisocyanate. The moldings of the invention made of thermoplastic polyurethane have the advantage that they can be recycled, and that these moldings can be welded thermally, for example for repair purposes. In contrast, although moldings made of thermoplastic polyurethane can in principle also be produced by the conventional injection-molding process, the size and complexity of the molds in the injection-molding process is subject to restriction because the viscosity of the molten polymers is higher than that of the reaction mixture in the process of the invention.

The hardness of the polyurethane moldings obtained by the process of the invention is 60 Shore D or more, preferably from 65 to 80 Shore D, and particularly preferably from 70 to 80 Shore D in accordance with DIN 53505. These moldings can by way of example be used as cladding components for commercial vehicles, interior and exterior uses in vehicle construction, bodywork constituents, cladding of housings, and cladding components of machine installations.

The tensile modulus of the moldings comprising filler is, in accordance with DIN EN ISO 527, preferably greater than 1200 MPa, particularly preferably greater than 1500 MPa, their tensile strain at break in accordance with DIN EN ISO 527 being greater than 3%, their flexural modulus measured in accordance with DIN EN ISO 178 being greater than 1200 MPa, and their heat distortion temperature in accordance with DIN EN ISO 75, determined as HDT/B, being above 120° C.

The polyol component used here in the process of the invention, comprising (a) polyesterdiol and (b) chain extender, exhibits high stability at temperatures including room temperature, and does not demix. The production process can moreover omit release agents, and in many cases also emulsifiers. This omission, and replacement of the expensive raw material polytetrahydrofuran, permits efficient production of the polyurethane elastomer moldings at low cost. Finally, the polyurethane moldings of the present invention exhibit excellent surface properties.

Examples will be used below to illustrate the invention.

Polyurethane moldings were produced as in the table below. For this, the isocyanate used was charged as isocyanate component, and the other starting materials were charged as polyol component, into a high-pressure machine and mixed by the countercurrent method at a temperature of in each case 70° C. and at a pressure of in each case 170 bar, and charged to a mold. The salt, if used, was dissolved entirely in the diamine at 110° C. before addition to the remaining constituents of the polyol component. Mold temperature was 110° C., mold volume was 3 l, and shot time was from 4 to 6 seconds. The quantities stated are parts by weight.

TABLE 1

|  | IE1 | IE2 | IE3 | IE4 | IE5 | CE1 | CE2 | CE3 |
|---|---|---|---|---|---|---|---|---|
| Polyol 1 | 57.5 | 29.0 | 28.5 | 34.6 | 34.6 |  |  |  |
| Polyol 2 |  |  |  |  |  | 50.1 | 27.2 | 26.9 |
| Chain extender 1 | 42 | 28.8 | 30.0 | 25.3 | 25.3 | 40.2 | 21.2 | 21.4 |
| Chain extender 2 |  |  |  |  |  | 5.6 | 3.0 | 3.0 |
| Cat | 0.05 | 0.03 | 0.03 | 0.05 | 0.05 | 0.02 | 0.02 | 0.01 |
| Emulsifier | 0.5 |  |  | 0.3 | 0.3 | 0.3 | 0.3 | 0.2 |
| Additive |  |  |  |  |  | 3.7 | 2.0 | 2.0 |
| Filler |  | 42.2 | 41.4 |  |  |  | 46.2 |  |
| Filler 2 |  |  |  | 39.7 | 39.7 |  |  | 46.4 |
| Fiber content [% by wt.] | 0 | 19 | 19 | 19 | 19 | 0 | 23 | 26 |
| Iso 1 | x | x | x | x | x |  |  |  |
| Iso 2 |  |  |  |  |  | x | x | x |
| Index | 104 | 103 | 105 | 100 | 104 | 104 | 104 | 104 |
| Mold temp. [° C.] | 120 | 110 | 130 | 120 | 100 | 120 | 120 | 120 |
| Density [g/l] | 1185 | 1300 | 1320 | 1388 | 1358 | 1075 | 1238 | 1162 |
| Hardness [Shore D] | 66 | 74 | 74 | 71 | 72 | 62 | 69 | 70 |
| Flexural stress [MPa] | 27 | 65 | 58 | 45 | 43 | 26 | 40 | 49 |
| Deflection [mm] | 13 | 11 | 12 | 13 | 13 | 14 | 10 | 11 |
| Flexural modulus [MPa] | 600 | 2000 | 1800 | 1500 | 1400 | 600 | 1400 | 1600 |
| HDT-B [° C.] | 139 | 154 | 159 | 130 | 133 | 54 | 154 | 186 |
| Surface quality | ++ | ++ | ++ | ++ | ++ | + | + | + |

Hardness was determined in accordance with DIN 53505. Flexural modulus, deflection and flexural stress were determined in accordance with DIN EN ISO 527. Heat distortion temperature HDT-B was determined in accordance with DIN EN ISO 75-1, -2, -3.

The definitions here are:
Polyol 1: Polyesterol made of adipic acid, 1,4-butanediol, 1,5-propanediol, and 1,6-hexanediol with OH number 56
Polyol 2: Polytetrahydrofuran with number-average molar mass 1000 g/mol
Chain extender 1: 1,4-butanediol
Chain extender 2: Jeffamin® D400 polyetheramine from Huntsman
Cat: Dimethyltin dilaurate
Emulsifier: BYK® 9904 emulsifier from Byk Chemie
Additive: Tin stearate
Filler 1: Lanxess® MF 7980 short glass fiber
Filler 2: Tremin®939-955 calcium silicate
Iso 1: Prepolymer made of 97 parts by weight of diphenylmethane 4,4'-diisocyanate and 2 parts by weight of carbodiimide-modified diphenylmethane 4,4'-diisocyanate and polyesterol made of adipic acid, monoethylene glycol, diethylene glycol, 1,4-butanediol and trimethylolpropane with functionality 2.15 and OH number 55 mg KOH/g and with 26% NCO content
Iso 2: 97 parts by weight of diphenylmethane 4,4'-diisocyanate and 2 parts by weight of carbodiimide-modified diphenylmethane 4,4'-diisocyanate and polytetrahydrofuran with number-average molar mass 1000 g/mol and 27% NCO content.

The polyurethane elastomer moldings obtained in the invention permit use of raw materials that are less expensive while at the same time providing very good mechanical properties. It is possible to omit mold release agent and emulsifier. There is a further improvement in the surface quality of the resulting moldings in comparison with moldings based on polytetrahydrofuran. Unfilled moldings also exhibit higher heat distortion temperature than PTHF-based moldings.

Stability of Isocyanate Component:
Iso 1 and Iso 2 were stored at 23° C. after production. Iso 1 was liquid and translucent after 24 hours, whereas Iso 2 had crystallized out.

The invention claimed is:

1. A process for the production of pore-free polyurethane elastomer moldings with a Shore D hardness of at least 60 in accordance with DIN 53505, the process comprising:
   mixing
   (a) a polyesterdiol with OH number from 20 to 100 mg KOH/g and
   (b) a chain extender composed of diol with molar mass below 300 g/mol, with
   (c) isocyanate prepolymers obtainable via reaction of diisocyanate with polyesterols with functionality from 1.95 to 2.2 and with OH number from 20 to 200 mg KOH/g
   to give a reaction mixture;
   charging the mixture to a mold; and
   hardening the mixture to form the polyurethane elastomer, wherein the ratio by weight of polyesterdiol (a) to chain extender (b) is in the range from 70:30 to 40:60.

2. The process according to claim 1, wherein the polyesterdiol (a) is obtainable via condensation of a dicarboxylic acid component and of a diol component, wherein the dicarboxylic acid component comprises adipic acid.

3. The process according to claim 1, wherein the polyesterdiol is obtainable via condensation of a dicarboxylic acid and of a diol component where the diol component comprises diols having 4 to 8 carbon atoms.

4. The process according to claim 1, wherein the isocyanate for the production of the isocyanate prepolymers (c) is diphenylmethane diisocyanate, inclusive of derivatives of diphenylmethane diisocyanate, with average functionality from 2.0 to 2.2.

5. The process according to claim 4, wherein the functionality of the diphenylmethane diisocyanate is 2.0.

6. The process according to claim 4, wherein the aromatic isocyanate for the production of the isocyanate prepolymers (c) is composed to an extent of 90% by weight of diphenylmethane 4,4"-diisocyanate and carbodiimide-modified diphenylmethane 4,4"-diisocyanate.

7. The process according to claim 1, wherein the reaction mixture comprises a nonionic surfactant as an emulsifier.

8. The process according to claim 1, wherein components (a) to (c) are mixed in a ratio to one another such that the isocyanate index is from 100 to 106.

9. The process according to claim 1, wherein the polyesterdiol (a) and the chain extender (b) are injected by the countercurrent method at a pressure of more than 100 bar into a mixing chamber, and are mixed there with the isocyanate prepolymers (c), and the resultant mixture is charged to a closed mold.

10. The process according to claim 1, wherein the chain extender (b) is 1,4-butanediol.

11. The process according to claim 1, wherein fillers and water-absorbent substances are used as additives.

12. A polyurethane molding obtainable by a process according to claim 1.

13. The use of a polyurethane molding according to claim 12 as cladding component for commercial vehicles, bodywork component in vehicle construction, or a cladding component of a machine installation.

14. The process according to claim 1 wherein the mixing step further comprises mixing the polyesterdiol (a), the chain extender (b) and the isocyanate prepolymers (c) with at least one of catalysts (d), emulsifiers (e) and other additives (f).

\* \* \* \* \*